METHOD OF PRODUCING A PHOTOCONDUCTIVE DEVICE

Filed Feb. 21, 1955

INVENTOR.
FREDERIC KOURY
BY Elmer J. Nealon
ATTORNEY 2,843,914

METHOD OF PRODUCING A PHOTO-CONDUCTIVE DEVICE

Frederic Koury, Lexington, Mass., assignor to Sylvania Electric Products Inc., a corporation of Massachusetts Application February 21, 1955, Serial No. 489,412
2 Claims. (Cl. 25—156)

This invention relates to photoconductive devices of the type having photosensitive elements comprising cadmium sulphide, and to a method of manufacturing such devices.

The photosensitive properties of cadmium sulphide have been well known for some time and photoconductive devices incorporating cadmium sulphide elements have enjoyed a commercial acceptance limited primarily by the fact that the heretofore employed techniques for making the photosensitive elements have not been amenable to large scale production and commensurately low production cost. Furthermore, although one of the desirable properties of cadmium sulphide as compared with other photosensitive materials, is its potentially excellent light sensitive or high photo current, it has been difficult heretofore to produce consistently cadmium sulphide elements of such uniformly high light sensitivity as to make possible their use with relatively low cost electrical relays.

Heretofore it has been the practice to follow one of two general procedures in the manufacture of cadmium sulphide photoconductive devices. One method has involved sublimation of cadmium sulphide under carefully controlled vacuum conditions, and deposition of the vapors in the form of a layer of crystals on a surface arranged within the vacuum zone. The surface commonly is one face of a supporting element, comprising an insulating material such as, for example, glass, ceramic or organic plastic, which constitutes a part of the final photoconductive device. If electrodes have not been provided in association with the supporting member prior to the vacuum deposition of the cadmium sulphide, great care must be exercised in the subsequent application of the electrodes to avoid mechanically disturbing the layer of cadmium sulphide crystals. The size and configuration of the crystal arrangement in these vacuum deposited layers are important to the electrical properties of the final element and extremely careful control of temperatures and pressures is therefore required in applying the cadmium sulphide to its supporting surface.

Another method which has been used involves the vapor phase reaction of cadmium and sulphur to produce single crystals of cadmium sulphide exhibiting photosensitive properties. In this procedure, cadmium and sulphur vapors are mixed and reacted at elevated temperatures in a small reaction chamber, as for example in a quartz tube. Crystals of various sizes and compositions form within the tube, and on removal therefrom, are sorted by hand to select those suitable for photoconductive purposes. For obvious practical reasons the selection of suitable crystals from each batch so produced must be based on visual inspection, and substantial variation between the sizes and compositions, and correspondingly, the electrical properties, of such crystals is experienced. The crystals selected for use are individually mounted on electrode or terminal elements, and are commonly sealed in glass or other suitable material for protection from the atmosphere. It is to be realized that these crystals are of very small dimensions, and relatively fragile, so that it can be readily appreciated why an inordinate amount of skill and time consuming effort is required to produce a photoconductive cell by this method.

Both of the methods mentioned above are characterized by the necessity for maintaining the crystalline form in which the cadmium sulphide is condensed from its vapor state. Attempts to avoid this, as for example by incorporating the crystals in a liquid vehicle and applying films of the mixture to a support have not met with success, possibly because of contamination of the cadmium sulphide by the vehicle.

It is a general object of the present invention, therefore, to provide a photoconductive device having a predictably high light sensitivity.

A more specific object is to provide a photoconductive device incorporating a photosensitive element comprising cadmium sulphide in a form not heretofore employed in photoconductive cells.

A still further object is to provide a method for making photoconductive devices of the cadmium sulphide type which is amenable to mass production techniques, and which eliminates the need for handling of individual crystals of relatively fragile layers of crystals of cadmium sulphide.

In contrast to the photosensitive elements obtained by the above-described methods, the cadmium sulphide elements of the present invention comprise a compacted mass of crystals sufficiently fused together to form a mechanically strong pellet or tablet of any desired size or shape. In the preparation of these elements, cadmium sulphide crystals produced by any suitable method such as, for example, by the vapor phase reaction of cadmium and sulphur are first heated to anneal the crystals and to remove therefrom readily volatilized impurities. The annealed crystals are then subjected to comminution to produce granules or particles of size smaller than the original crystals, which are compressed in a suitable mold to produce a coherent pellet or tablet of substantially the final dimensions of the desired photosensitive element. In order to provide in the pellet the desired light sensitive characteristic and to produce an element of sufficient mechanical strength, the pellet is then subjected to a temperature sufficiently high to induce sintering of the mass of crystals. After application of electrode means to the sintered pellet in a manner described hereinafter in more detail, the element preferably is protected from the atmosphere by enclosing it in an evacuated vessel or by casting or molding it into a moisture resistant material in any of the various manners well known to those skilled in the art.

The invention and the various features and advantages thereof will be understood more clearly and fully from the following detailed description and by reference to the accompanying drawings in which.

Figures 1, 2, 3, 4, 5, 6, 7, 8:
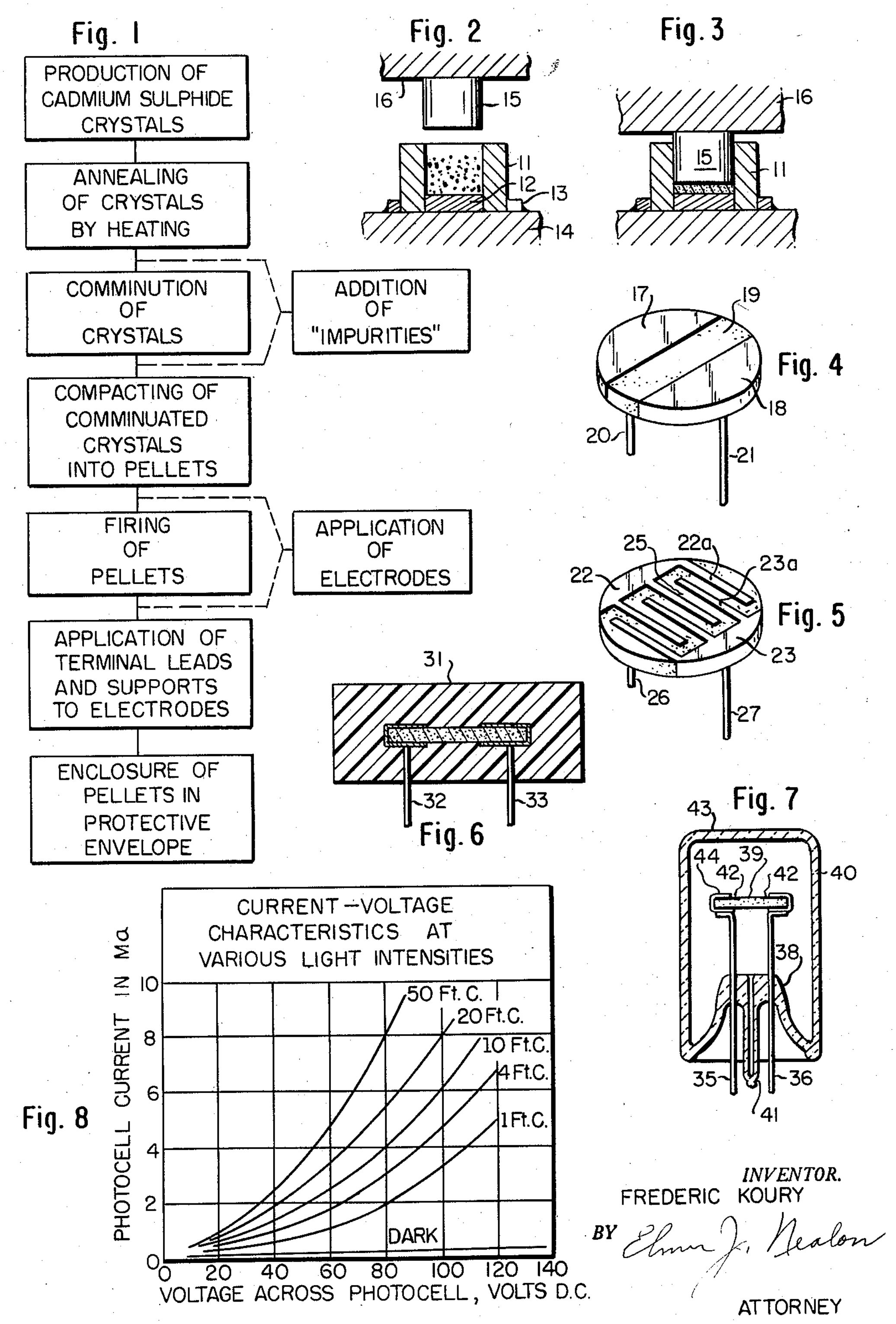
Fig. 1 shows schematically the process of producing photoconductive devices in accordance with the present invention.
Fig. 2 is a view, partly in cross-section, of a mold for pelleting cadmium sulphide in accordance with one of the steps of the method of the invention, showing the mold in open position and the cavity filled with cadmium sulphide granules.
Fig. 3 is another view of the mold shown in Fig. 2 with the mold plunger advanced and a pellet of cadmium sulphide therein formed by the compacting of the volume of granules shown in the mold in Fig. 2.
Fig. 4 shows one type of photosenstitive element of the invention including the cadmium sulphide pellet with electrodes and terminal leads attached thereto.
Fig. 5 illustrates another photosentitive element including a modification of the form of electrode shown in Fig. 4.
Fig. 6 illustrates a photoconductive cell in accordance with the invention in which the photosensitive element is embedded in an insulating material for protection from the atmosphere.
Fig. 7 shows another photoconductive cell in which the photosensitive element is mounted in an evacuated tube.
Fig. 8 is a graph showing the relationship of current to voltage at various light intensities obtained from tests of a photoconductive cell produced in accordance with the present invention.

As indicated in the above brief description of the method of my invention, the cadmium sulphide crystals may be produced by the vapor phase reaction of cadmium and sulphur. This operation has been described in the literature and has been employed in the past in the preparation of single-crystal type photosensitive devices. Accordingly, it is believed unnecessary to elaborate here on the details of this step of my process. Briefly it involves bringing together vapors of cadmium and sulphur in a reaction zone maintained at a temperature in the range of 900°–1000° C. The crystals of cadmium sulphide which are produced and deposited in the reaction zone under these conditions are of various sizes and compositions, and normally are contaminated with unreacted sulphur or cadmium, or both.

As mentioned previously in this specification it has been necessary heretofore at this point to select from batches of impure crystals those which are of suitable size and which have the characteristics necessary for use in single crystal elements. However, referring to the process flow diagram of Fig. 1, it will be seen that in accordance with the method herein disclosed this tedious operation is entirely eliminated. Instead, the batches of impure crystals are next subjected to a heating operation at a temperature and for a time sufficient to anneal the crystals and to remove therefrom by volatilization any unreacted sulphur or cadmium which might be present. In order to prevent oxidation of the cadmium sulphide this step is carried out in an inert atmosphere such as, for example, in helium, argon, or hydrogen. The time required for this operation is of course dependent to a large extent on the temperature employed. Preferably the crystals are heated in this stage of the process at a temperature between about 450° C. and about 550° C. for a period of from about one-half to three hours. An important effect of this annealing treatment is to make more uniform the friability of the crystals so that more uniform comminution of the crystals into granules can be accomplished in the subsequent grinding step. In this way excessive amounts of fines and over-size hard particles are avoided.

After heat treatment, the crystals are mechanically comminuted or disintegrated into granules or particles of such size that they can be readily compacted into pellets or tables in the subsequent step of the process. This comminution operation can be accomplished by various well known techniques such as, for example, by crushing, grinding or rolling. The extent to which the crystals are broken up in this operation does not appear to be of significance as far as the characteristics of the final photosensitive element is concerned and I have found that a relatively wide range of particle sizes can be employed in the subsequent compacting operation. However, from the standpoint of ease of handling and the mechanical strength of pellets subsequently produced, it is preferable to reduce the crystals of cadmium sulphide to a particle size of 40–100 mesh. It is important that the substantial mixing of each batch of crystals which is effected during the comminution operation results in uniformity of electrical and chemical characteristics between separate batches of crystals and portions of each batch of crystals subsequently formed into separate pellets. This apparently contributes in large part to the predictability and uniformity of the performance characteristics of the photoconductive devices of the present invention.

In some cases it may be desired to modify the properties of the cadmium sulphide by the deliberate addition of material known in the art as "doping agents" or "impurities." For example, the addition of gallium, indium or antimony is effective to increase the conductivity of the cadmium sulphide. Certain other materials, for example, silver, tend to decrease the conductivity. As is well known, these added impurities can be tolerated in the cadmium sulphide in only minute or trace amounts. Heretofore, for the reason that it has been necessary to maintain the cadmium sulphide in the form in which it is crystallized or condensed from the vapor phase, it has been necessary to accomplish the addition of the trace impurities by vaporization of the doping agent and mixing of the vapors with the cadmium sulphide vapors. The difficulties involved in obtaining adequate control of the very small additions using this technique has discouraged efforts to modify the cadmium sulphide to obtain special characteristics. The problem of adding trace impurities is simplified in the present method by the fact that it is not necessary to maintain the cadmium sulphide in the form in which it is deposited from the vapor phase. Referring to the flow sheet of my process in Fig. 1, it will be seen that I may add the desired traces of impurities before or after completion of the comminution step. This may be done, for example, by the well known "aliquot part" technique in which very small amounts of the doping agent are incorporated in a relatively substantial quantity of cadmium sulphide. In turn, appropriate small quantities of this mixture are added to the main body of cadmium sulphide passing through the process. By repeating the dilution of the doping agent in two or more such "aliquot part stages" extremely accurate additions of minute traces of doping agent can be achieved. If the "aliquot part" of doped cadmium sulphide is added to the main quantity of crystals before or during the comminution step, sufficient blending of the doping agent may be obtained incidental to the comminution. If added after the comminution, further mixing is desirable to obtain the desired uniformity of distribution of the doping agent.

The granulated cadmium sulphide with doping agent added if desired is next formed into pellets of substantially the size of the ultimate photosensitive element in a mold such as that shown in Figs. 2 and 3. In this operation sufficient weight of the granulated material is placed in the cavity of the mold defined by the cylindrical member 11 and the removable plug 12 to produce a pellet or tablet of the desired thickness. As shown in the drawings, the mold is supported on a stationary platen 14 of a hydraulic press and is held in proper lateral position by ring member 13 secured to the platen. With the proper quantity of granulated cadmium sulphide in the mold, the plunger 15 secured to the upper movable press platen 16 is moved downward by a hydraulic piston (not shown) acting on the movable platen until the plunger is in its final position as shown in Fig. 3. Sufficient pressure is applied on the compressed mass of granules in the mold to mechanically knit the granules together and thereby to produce a pellet of adequate strength for removal from the mold and for handling in the next operation to which it is subjected. I have found that pressures in the range of 1000 to 3000 pounds per square inch are suitable. Higher pressures may be employed, but no benefit is realized thereby. The pellet is removed from the mold by retracting the plunger 15 and lifting the cylinder 11 from the bottom platen as will be obvious from the drawings.

In order to fully develop the photosensitive properties of the pellets formed by the above operation, they are subjected to a sufficiently high temperature in an atmosphere of inert gas such as helium, argon or hydrogen to effect sintering and coalescence of the granules of cadmium sulphide. This firing or sintering operation can be accomplished at temperatures within the rage of 500° to 1000° C. However, I have obtained particularly good results by heating the pellets for a period of about 15 minutes at temperatures of from about 850° to 900° C.

Inspection of the pellets under sufficient magnification after the sintering step reveals that the individual granules which are merely mechanically linked together by the process of compacting the comminuted cadmium sulphide crystals, have coalesced during the subsequent heating operation into substantially larger particles or crystals which in turn are bonded by fusion into adjacent large crystals. It is apparently this structure which affords the excellent strength and desirable photosensitive properties of the final elements.

The metallic electrodes may be applied to the pellets by various methods. For example the areas of the pellet to be left exposed in the ultimate photosensitive element may be masked and the remaining surfaces coated with a metal of good conductivity such as, for example, gold, silver, copper, or aluminum. Depending on the particular metal to be used, it can be applied by plating techniques, by evaporation of the metal and condensation on the area to be coated, or by spraying the metal in molten form. Various of these methods have been used heretofore in applying the metallic electrode surfaces to photosensitive elements of the type produced by deposition of cadmium sulphide under high vacuum conditions. However, because of the relatively high strength and rugged nature of the photosensitive pellets produced by my method I am able to apply the metallic electrodes to the pellets by coating the appropriate areas of the pellets with liquid solutions or suspensions of the metal using devices such as rubber stamps or rollers. In this way the need for masking the surfaces of the pellets to define the electrode areas is eliminated.

Although the high mechanical strength of the pellets subsequent to the firing operation simplifies the problem of applying the electrodes, it is to be understood that, alternatively, the electrodes may be applied prior to the firing operation. This latter order of operations is particularly advantageous where the electrode metal employed is of such a nature that when present in trace quantities in the cadmium sulphide, it affords specific desired electrical characteristics in the pellet. In such case the electrode area is fired on the surface of the element and the sintering operation induces the desired limited diffusion of the electrode metal into the cadmium sulphide adjacent the electrode areas.

In Fig. 4 there is shown a photosensitive element including a cadmium sulphide pellet prepared in accordance with the method of my invention and having applied thereto the metallic electrode surfaces 17 and 18. In the particular embodiment of the invention shown in this figure, the top, bottom and edges of the pellet are covered with metal in the two zones 17 and 18, leaving the surface of the cadmium sulphide pellet exposed in a central area or belt 19 surrounding the pellet. The terminal leads 20 and 21 are secured to the electrode areas, preferably by soldering.

Because of the high resistivity of cadmium sulphide it is desirable to maintain as short as possible the path of current flow therein. At the same time, in order to take full advantage of the light sensitive properties of the cadmium sulphide, the surface of the cadmium sulphide exposed to the light should be as great as possible, consistent with maintaining the photosensitive element as compact as possible. These considerations are reflected in the electrode arrangement provided in the photosensitive element shown in Fig. 5. In this embodiment the electrodes 22 and 23 on the side of the pellet to be arranged toward the light source include narrow extensions 22a and 23a of the main electrode areas. As in Fig. 4, the terminal leads 26 and 27 are secured to the electrodes on the side of the pellet opposite to that on which the light falls. The extensions overlap in alternate fashion as shown in the drawing and define therebetween narrow strips of the surface 25 of the cadmium sulphide pellet exposed to the light source. The number of these extensions and their configuration may be widely varied. For example, they may be of arcuate shape to utilize more fully the shape of the surface available on a circular pellet. It is to be realized, of course, that the photosensitive elements may be of a shape other than circular depending on the other design features of the photoconductive cells in which the elements are incorporated. Similarly, the size of the pellet may be widely varied depending on the requirements of the ultimate photoconductive cell. A typical pellet of the type herein described is in the form of a circular disc 0.725 inch in diameter and 0.065 inch thick.

Various means may be employed for protecting the above-described photosensitive elements from the atmosphere. For example, Fig. 6 shows a photoconductive cell in which a photosensitive element of the type shown in Fig. 5 and made by the method described herein is surrounded by a casting or molding operation with a low-melting glass or a transparent plastic material 31. The terminal leads 32 and 33 are permitted to protrude to facilitate electrical connection of the photosensitive element with associated devices. Any suitable transparent plastic such as, for example, those of the acrylate, methacrylate, polyester or styrene types may be employed.

Instead of embedding the element in glass or plastic, it may be mounted within an evacuated glass envelope or tube as shown in Fig. 7. In the device shown, the terminal leads 35 and 36 sealed into the glass press 38 are of sufficient rigidity to support the cadmium sulphide pellet 39 in position within the glass envelope 40. Exhaust tubing 41 is provided for evacuation of the envelope after the element has been sealed into place. In the particular device shown in this figure, the electrode areas 42 have been applied to only the upper surface of the pellet which is exposed to light passing through the transparent end 43 of the envelope. The metallic clamping members 44 secured, as by soldering, to the upper ends of the terminal leads are bent over the top of the pellet to hold the pellet in position and to complete the electrical path between the electrode areas and the terminal leads.

Fig. 8 shows graphically the performance characteristics at room temperature of a typical photoconductive cell made in accordance with the present invention. The cadmium sulphide pellet employed was 0.625 inch in diameter and 0.063 inch in thickness and was cast in a small cylinder of a transparent polyester resin as shown in Fig. 6. The silver electrode surfaces and terminal leads were also as shown in Fig. 6. As may be seen from Fig. 8, the cell was characterized by a very low dark current event at bias voltages in the range of 100–120 volts. Furthermore, substantial light currents were obtained at relatively low light intensities. For example, with 10 foot candles illumination, a current of over 6 milliamperes was obtained with a bias of 100 volts across the cell. At an illumination of only 1 foot candle, a current of about 5 milliamperes passed through the cell with a bias of 120 volts. It is noted that these current values are adequate for operation of relatively low cost relays, thus obviating the necessity for expensive current amplification arrangements in the application of the photoconductive cells of the present invention. Furthermore by tests of a substantial number of cells of the design and dimensions of that with which the data of Fig. 8 was obtained, I have found that the current values measured at the various bias voltages and light intensities, were consistently within 10 percent of the values given in Fig. 8.

In contrast to many of the cadmium sulphide photosensitive devices heretofore available on the market, the photoconductive cells of this invention show no evidence of polar characteristics. Thus, although the test results illustrated in Fig. 8 were obtained with a D. C. source of bias voltage, curves of nearly identical appearance and showing substantially the same current values are obtained with A. C. bias voltages. By virtue of this characteristic the cells can be used directly with domestic current supply sources without the necessity for costly rectification equipment.

What is claimed:

1. The method of producing a photoconductive device of the cadmium sulphide type which comprises heating cadmium sulphide crystals to anneal the crystals and to remove therefrom volatilizable impurities, comminuting the purified crystals to form therefrom granules of smaller size than the original crystals, molding said granules into a coherent pellet, and thereafter heating said pellet to a sintering temperature to cause coalescence of the granules into crystals of size greater than said granules.

2. The method of producing a photoconductive device of the cadmium sulphide type which comprises reacting vapors of cadmium and sulphur to obtain crystals of cadmium sulphide, heating said crystals at a temperature between about 450° C. and 550° C. for one-half to three hours to remove therefrom volatilizable impurities, comminuting the purified crystals to obtain particles of cadmium sulphide of 40–100 mesh size, compacting a quantity of said particles into a coherent body and thereafter heating said body at a temperature between about 850° C. and 900° C. for about 15 minutes to cause sintering of said particles.

References Cited in the file of this patent

UNITED STATES PATENTS

| | | |
|---|---|---|
| 2,651,700 | Gans | Sept. 8, 1953 |
| 2,668,867 | Ekstein | Feb. 9, 1954 |

Notice of Adverse Decision in Interference

In Interference No. 91,560 involving Patent No. 2,843,914, F. Koury, Method of producing a photoconductive device, final judgment adverse to the patentee was rendered July 12, 1962, as to claims 1 and 2.

[*Official Gazette August 7, 1962.*]